US012085887B2

(12) United States Patent
Kato et al.

(10) Patent No.: US 12,085,887 B2
(45) Date of Patent: Sep. 10, 2024

(54) FIXING DEVICE INCLUDING SHUTTER PIVOTABLE ABOUT AXIS POSITIONED DOWNSTREAM OF NIPPING REGION IN SHEET CONVEYING DIRECTION

(71) Applicant: Brother Kogyo Kabushiki Kaisha, Nagoya (JP)

(72) Inventors: Yasutada Kato, Nagoya (JP); Yuichi Ikeno, Maibara (JP); Kazuna Taguchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/327,090

(22) Filed: Jun. 1, 2023

(65) Prior Publication Data

US 2024/0004340 A1 Jan. 4, 2024

(30) Foreign Application Priority Data

Jun. 29, 2022 (JP) ................................ 2022-104688
Jun. 29, 2022 (JP) ................................ 2022-104689

(51) Int. Cl.
*G03G 21/16* (2006.01)

(52) U.S. Cl.
CPC ..... *G03G 21/1647* (2013.01); *G03G 21/1685* (2013.01)

(58) Field of Classification Search
CPC .......... G03G 21/1647; G03G 21/1685; G03G 15/2028; G03G 2221/1675; G03G 21/1638
See application file for complete search history.

(56) References Cited

U.S. PATENT DOCUMENTS

| | | | | |
|---|---|---|---|---|
| 2019/0163103 A1* | 5/2019 | Iizuka | ................ | G03G 21/1685 |
| 2019/0286023 A1* | 9/2019 | Cho | .................. | G03G 15/2028 |
| 2023/0082752 A1* | 3/2023 | Toyota | ............... | G03G 21/1647 399/328 |

FOREIGN PATENT DOCUMENTS

| | | |
|---|---|---|
| JP | 2002-072750 A | 3/2002 |
| JP | 2006-047593 A | 2/2006 |
| JP | 2006-182465 A | 7/2006 |
| JP | 2015-191115 A | 11/2015 |

* cited by examiner

*Primary Examiner* — Sandra Brase
(74) *Attorney, Agent, or Firm* — KENEALY VAIDYA LLP

(57) ABSTRACT

A fixing device includes a first rotatable body, a second rotatable body, a frame, and a shutter. The frame supports the first rotatable body and the second rotatable body. The first rotatable body and the second rotatable body provide a nipping region therebetween where a sheet is configured to be conveyed in a conveying direction. The sheet is configured to pass through an opening of the frame to be conveyed toward the nipping region. The shutter is pivotally movable about a first axis between a closed position where the shutter closes the opening and an open position where the shutter opens the opening. The first axis is positioned downstream of the nipping region in the conveying direction.

16 Claims, 12 Drawing Sheets

FIXING DEVICE INCLUDING SHUTTER PIVOTABLE ABOUT AXIS POSITIONED DOWNSTREAM OF NIPPING REGION IN SHEET CONVEYING DIRECTION

REFERENCE TO RELATED APPLICATIONS

This application claims priorities from Japanese Patent Application Nos. 2022-104689 filed on Jun. 29, 2022 and 2022-104688 filed on Jun. 29, 2022. The entire contents of the priority applications are incorporated herein by reference.

BACKGROUND ART

There has been known a fixing device for fixing an image on a sheet. One conventional fixing device includes a shutter configured to open and close a sheet inlet of a housing of the fixing device. The shutter is pivotally movable about a pivot axis that is positioned near the sheet inlet of the housing.

There has been also known a conventional fixing device of another type that includes a mechanism for changing a nipping pressure between a heat roller and a pressure roller, in addition to the shutter. The nipping pressure changing mechanism includes a pressure arm configured to urge the pressure roller toward the heat roller in cooperation with a spring, and a cam configured to urge the pressure arm against an urging force of the spring for reducing the nipping pressure.

DESCRIPTION

In the above-descried conventional fixing device, the pivot axis is positioned in the vicinity of a portion of the shutter which closes the shutter inlet. Accordingly, the shutter is required to pivotally move by a relatively larger amount than otherwise for opening and closing the sheet inlet.

Further, according to the above-descried conventional fixing device provided with the nipping pressure changing mechanism, an image forming apparatus incorporating the fixing device may become bulky if a pivot axis of the cam is arranged at a different position from the pivot axis of the shutter.

In view of the foregoing, it is an object of the disclosure to provide a fixing device capable of reducing a pivotally moving amount of the shutter.

It is another object of the disclosure to provide a fixing device capable of suppressing an increase in size of the image forming apparatus incorporating the fixing device that includes the shutter and the nipping pressure changing mechanism.

In order to attain the above and other objects, according to one aspect, the disclosure provides a fixing device including a first rotatable body, a second rotatable body, a frame supporting the first rotatable body and the second rotatable body, and a shutter. The first rotatable body and the second rotatable body provide a nipping region therebetween where a sheet is configured to be conveyed in a conveying direction. The frame has an opening to allow the sheet to pass through the opening to be conveyed toward the nipping region. The shutter is pivotally movable about a first axis between a closed position where the shutter closes the opening and an open position where the shutter opens the opening. The first axis is positioned downstream of the nipping region in the conveying direction.

According to the configuration, a portion of the shutter for closing the opening can be positioned farther away from the first axis, thereby reducing a pivotally moving amount of the shutter required for opening and closing the shutter.

Further, since the pivot axis of the shutter (the first axis) is coincident with a pivot axis of a cam that is provided for changing a nipping pressure at the nipping region, a mechanical component defining the pivot axis of the shutter need not be provided at the frame, in addition to a component constituting the pivot axis of the cam. Accordingly, the image forming apparatus incorporating the fixing device of the disclosure can be made compact.

ONE EMBODIMENT

Figure 1:
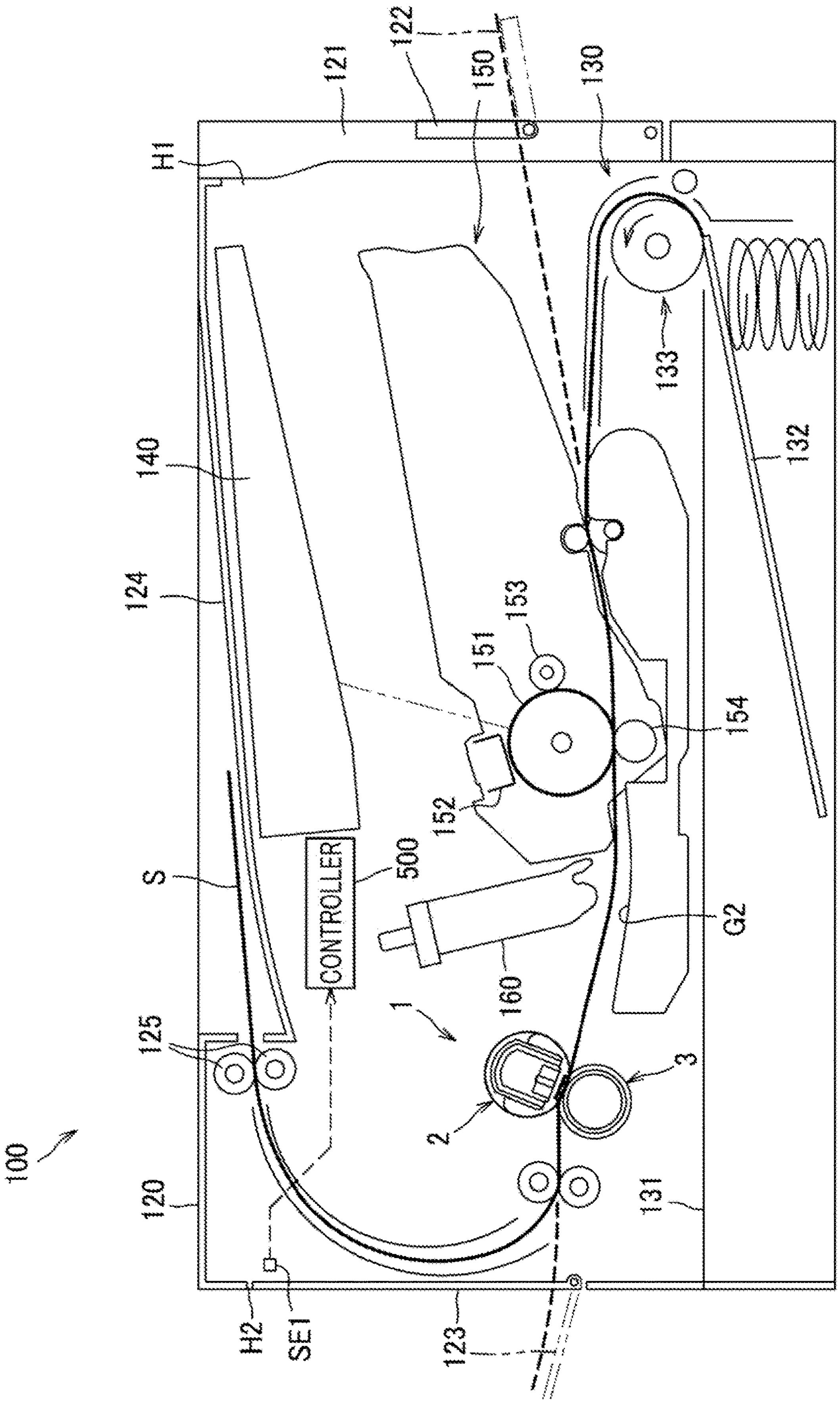
FIG. 1 is a schematic view illustrating a laser printer incorporating a fixing device according to one embodiment of the disclosure.

Hereinafter, a fixing device 1 according to one embodiment of the present disclosure will be described with reference to accompanying drawings.

1. Overview of the Laser Printer 100

Referring to FIG. 2, a laser printer 100 includes a housing 120, a sheet supplying portion 130, an exposing device 140, a process cartridge 150, the fixing device 1 according to the embodiment, and a controller 500.

The housing 120 includes a front cover 121, a manual insertion tray 122, a rear cover 123, and a discharge tray 124.

The front cover 121 is configured to open and close a first opening H1 of the housing 120. The first opening H1 has such a size that the process cartridge 150 can pass through the first opening H1. The manual insertion tray 122 is used for performing printing on a sheet S (for example, a thick sheet such as a postcard) that is conveyed along a linear conveying passage (see a bold break line in FIG. 1). In the following description, printing performed through the linear conveying passage will be referred to as "straight printing".

The rear cover 123 is configured to open and close a second opening H2 of the housing 120. The second opening H2 is an opening through which the sheet S is configured to be discharged from the fixing device 1 during the straight printing. The rear cover 123 is opened to support the sheet S discharged out of the second opening H2 at the time of performing the straight printing. The discharge tray 124 is configured to support the sheet S discharged out of the housing 120 in a state where the rear cover 123 is closed.

The laser printer 100 further includes a cover sensor SE1 configured to detect whether the rear cover 123 is closed. The cover sensor SE1 is electrically connected to the controller 500 to transmit information detected by the cover sensor SE1 to the controller 500.

The sheet supplying portion 130 is configured to supply a sheet S toward a photosensitive drum 151 (described later). The sheet supplying portion 130 includes a sheet tray 131, a lifter plate 132, and a sheet pick-up mechanism 133. The sheet tray 131 is configured to accommodate the sheets S therein. The sheets S on the sheet tray 131 are lifted upward by the lifter plate 132, and are separated one by one by the sheet pick-up mechanism 133 such that an uppermost sheet S is supplied toward the process cartridge 150 by the sheet pick-up mechanism 133.

The exposing device 140 includes a laser light source, a polygon mirror, lenses, and a reflection mirror all of which are not illustrated. The exposing device 140 is configured to expose a peripheral surface of the photosensitive drum 151 to a laser beam that is configured to be emitted from the laser light source based on image data.

The process cartridge 150 is attachable to and detachable from the housing 120 through the first opening H1. The process cartridge 150 includes the photosensitive drum 151, a charger 152, a developing roller 153, and a transfer roller 154.

The charger 152 is configured to charge the peripheral surface of the photosensitive drum 151 to form an electrostatic latent image on the peripheral surface.

The developing roller 153 is configured to supply toner in the process cartridge 150 to the electrostatic latent image formed on the peripheral surface of the photosensitive drum 151, thereby forming a toner image on the peripheral surface of the photosensitive drum 151. The toner image on the photosensitive drum 151 is then configured to be transferred onto the sheet S while the sheet S conveyed by the sheet supplying portion 130 passes through a position between the photosensitive drum 151 and the transfer roller 154.

2. Detailed Structure of the Fixing Device 1

The fixing device 1 is configured to fix a toner image to the sheet S. The sheet S to which the toner image has been fixed is then configured to be conveyed to the discharge tray 124 by a pair of discharge rollers 125.

Figure 2A:
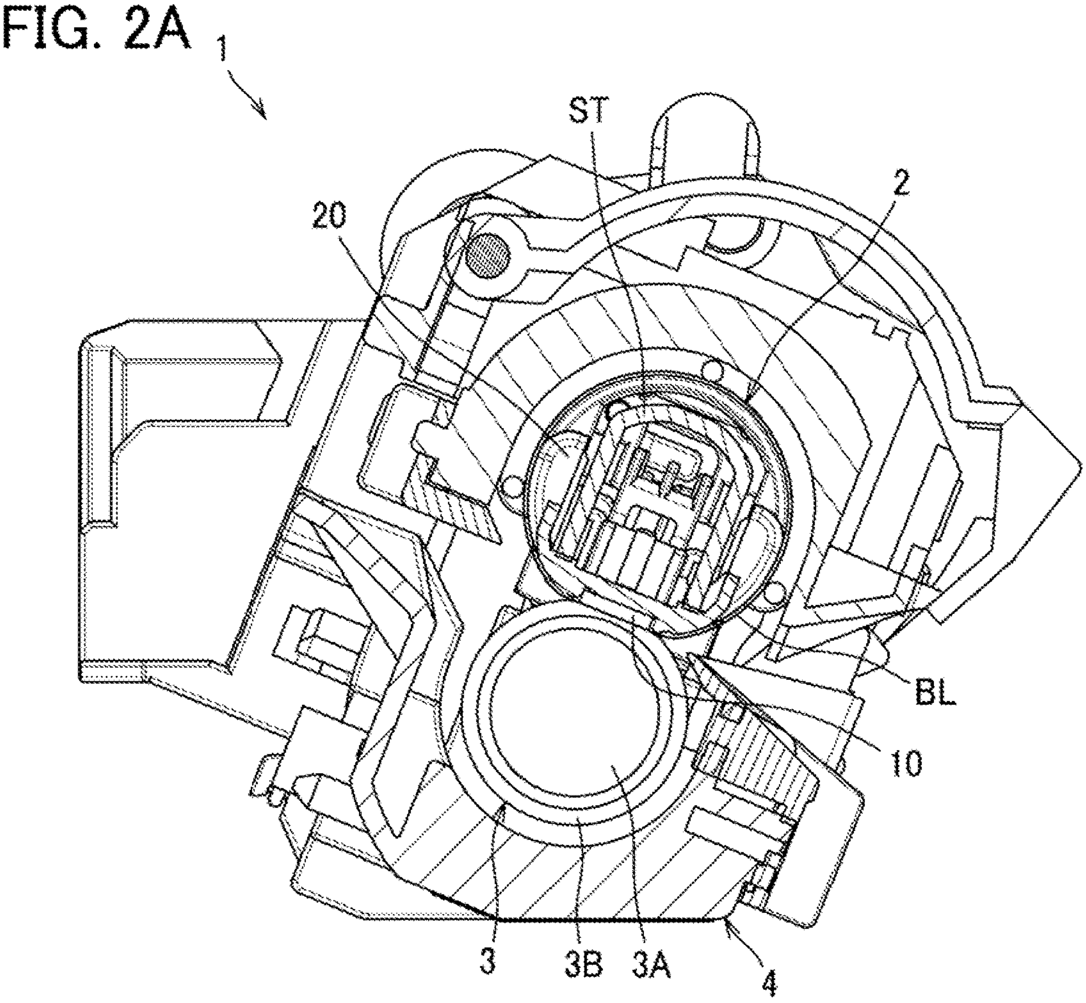
FIG. 2A is a cross-sectional view of the fixing device.

As illustrated in FIG. 2A, the fixing device 1 includes a heating unit 2, a pressure roller 3, and a frame 4 supporting the heating unit 2 and the pressure roller 3.

The pressure roller 3 is a rotatable roller. The pressure roller 3 includes a solid cylindrical shaft 3A, and a hollow cylindrical roller portion 3B. The shaft 3A is made from metal, and the roller portion 3B is made from rubber, for example. The roller portion 3B covers a part of the shaft 3A. The pressure roller 3 and the heating unit 2 provide a nipping region NP (see FIG. 2B) therebetween. Specifically, the pressure roller 3 and a belt BT (described later) of the heating unit 2 provide the nipping region NP therebetween.

Figure 2B:
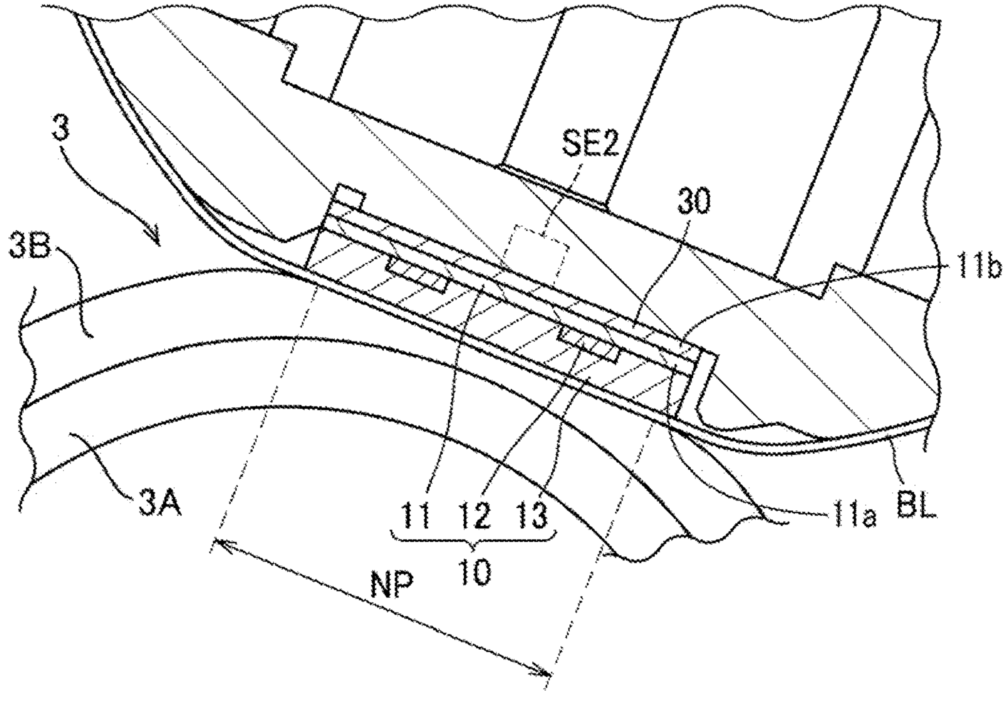
FIG. 2B is a partially enlarged cross-sectional view of a portion near a heater of the fixing device.

As illustrated in FIGS. 2A and 2B, the heating unit 2 includes a heater 10, a holder 20, a heat conduction member 30, a stay ST, the belt BL, and a temperature sensor SE2.

The heater 10 is configured to heat the belt BL for heating the sheet S through the belt BL. The temperature sensor SE2 is configured to detect a temperature of the heater 10 and transmit the detected temperature to the controller 500. The temperature sensor SE2 is in contact with the heat conduction member 30.

The heater 10 is a so-called ceramic heater. As illustrated in FIG. 2B, the heater 10 includes a substrate 11, a pair of resistance heating elements 12 mounted on the substrate 11, and a cover 13.

Figures 3A, 3B, 3C:
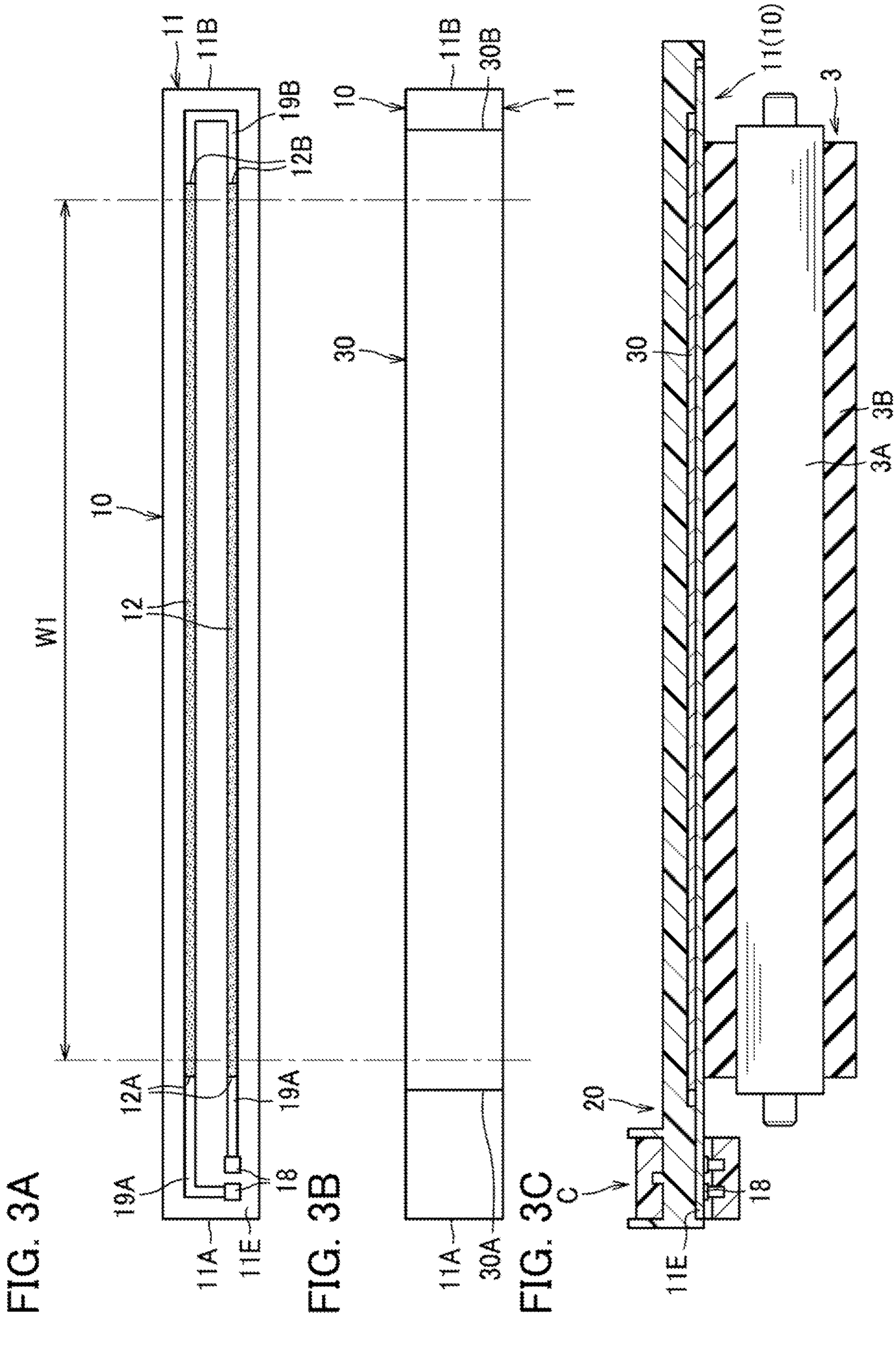
FIG. 3A is a schematic view illustrating a surface of the heater where resistance heating elements are arranged.
FIG. 3B is a schematic view illustrating another surface of the heater where a heat conduction member is provided.
FIG. 3C is a cross-sectional view of the heater and components in the vicinity thereof taken alone a plane extending in a longitudinal direction of the heater.

The substrate 11 is in a form of an elongated rectangular plate made from a ceramic material such as aluminum oxide. The substrate 11 has a surface 11*a* on which the resistance heating elements 12 are formed by printing. As illustrated in FIG. 3A, two resistance heating elements 12 are formed on the surface 11*a* of the substrate 11 in the present embodiment. The two resistance heating elements 12 extend parallel to each other in a longitudinal direction of the substrate 11, and are spaced apart from each other in a short direction perpendicular to the longitudinal direction. The short direction with respect to the substrate 11 is coincident with a direction in which the sheet S at the nipping region NP is configured to be conveyed. In other words, the two resistance heating elements 12 are arranged on the substrate 11 such that the resistance heating elements 12 are arrayed with each other in the conveying direction of the sheet S. In the following description, the conveying direction of the sheet S at the nipping region NP will be simply referred to as "conveying direction".

Referring to FIG. 3A, each resistance heating element 12 has one end 12A connected to one end of a lead wire 19A. Each lead wire 19A has another end provided with a power feed terminal 18 configured to supply power to the corresponding resistance heating element 12.

Each of the power feed terminals 18 is electrically connected to the corresponding resistance heating element 12 through the corresponding lead wire 19A. The power feed terminal 18 is positioned at one end portion 11E of the substrate 11 in the longitudinal direction thereof. As illustrated in FIG. 3C, a connector C is connected to the power feed terminals 18 for supplying power to the heater 10. The connector C is attachable to and detachable from one end portion of the heater 10 in a longitudinal direction thereof. The power feed terminals 18 are configured to receive power from the connector C attached to the heater 10. Incidentally, in FIG. 3C, the resistance heating elements 12, the cover 13 and the belt BL are not illustrated to facilitate understanding.

As illustrated in FIG. 3A, each resistance heating element 12 has another end 12B opposite the one end 12A in the longitudinal direction. The other ends 12B of the resistance heating elements 12 are connected to each other through a lead wire 19B.

Incidentally, the resistance heating elements 12 need not be two and may be arbitrary. Further, the resistance heating elements 12 may be configured of two resistance heating elements: a first resistance heating element and a second resistance heating element elongated in the longitudinal direction. The first resistance heating element may have a longitudinal center portion configured to generate a heat quantity greater than that generated at longitudinal end portions thereof, and the second resistance heating element may have longitudinal end portions configured to generate a heat quantity greater than that generated at a longitudinal center portion thereof. The first and second resistance heating elements may be controlled individually in order to control distribution of heat generation with respect to the longitudinal direction.

As illustrated in FIG. 2C, the cover 13 covers the resistance heating elements 12. The cover 13 is made from glass, for example.

As illustrated in FIG. 2A, the holder 20 supports the heater 10. The holder 20 is configured to guide the belt BL. The holder 20 is made from resin, for example.

The stay ST supports the holder 20. The stay ST is made from metal, for example.

The belt BL is an endless belt, and is made from metal or resin. The belt BL is circularly movable around the heater 10 while the belt BL is being guided by the holder 20. The belt BL has an inner peripheral surface in contact with the heater 10, and an outer peripheral surface configured to contact the pressure roller 3 or the sheet S (as a target to be heated).

The heat conduction member 30 is configured to conduct heat generated by the heater 10 in the longitudinal direction thereof to provide uniform temperature along the entire length of the heater 10 in the longitudinal direction. The heat conduction member 30 has a plate like shape and is positioned between the heater 10 and the holder 20. The heat conduction member 30 is provided at a surface 11*b* of the substrate 11 opposite the surface 11*a* (see FIG. 2B). In a state where the sheet S is nipped between the heating unit 2 and the pressure roller 3 at the nipping region NP, the heat conduction member 30 is interposed between the heater 10 and the holder 20. The heat conduction member 30 is made from aluminum, for example.

As illustrated in FIGS. 3A and 3B, the one end 12A and the other end 12B of each resistance heating element 12 are positioned outward of a maximum width W1 of the sheet S applicable to the heating unit 2 with respect to the longitudinal direction. The one end 12A and the other end 12B of each resistance heating element 12 are also positioned inward of one end and another end 30B of the heat conduction member 30 in the longitudinal direction, respectively. That is, with respect to the longitudinal direction, the heat conduction member 30 has a length greater than a length of each resistance heating element 12.

The substrate 11 has a length greater than the length of the heat conduction member in the longitudinal direction. The one end 30A of the heat conduction member 30 is positioned inward of one end 11A of the substrate 11 in the longitudinal direction. The other end of the heat conduction member 30 is positioned inward of another other end 11B of the substrate 11 in the longitudinal direction.

Figure 4A:
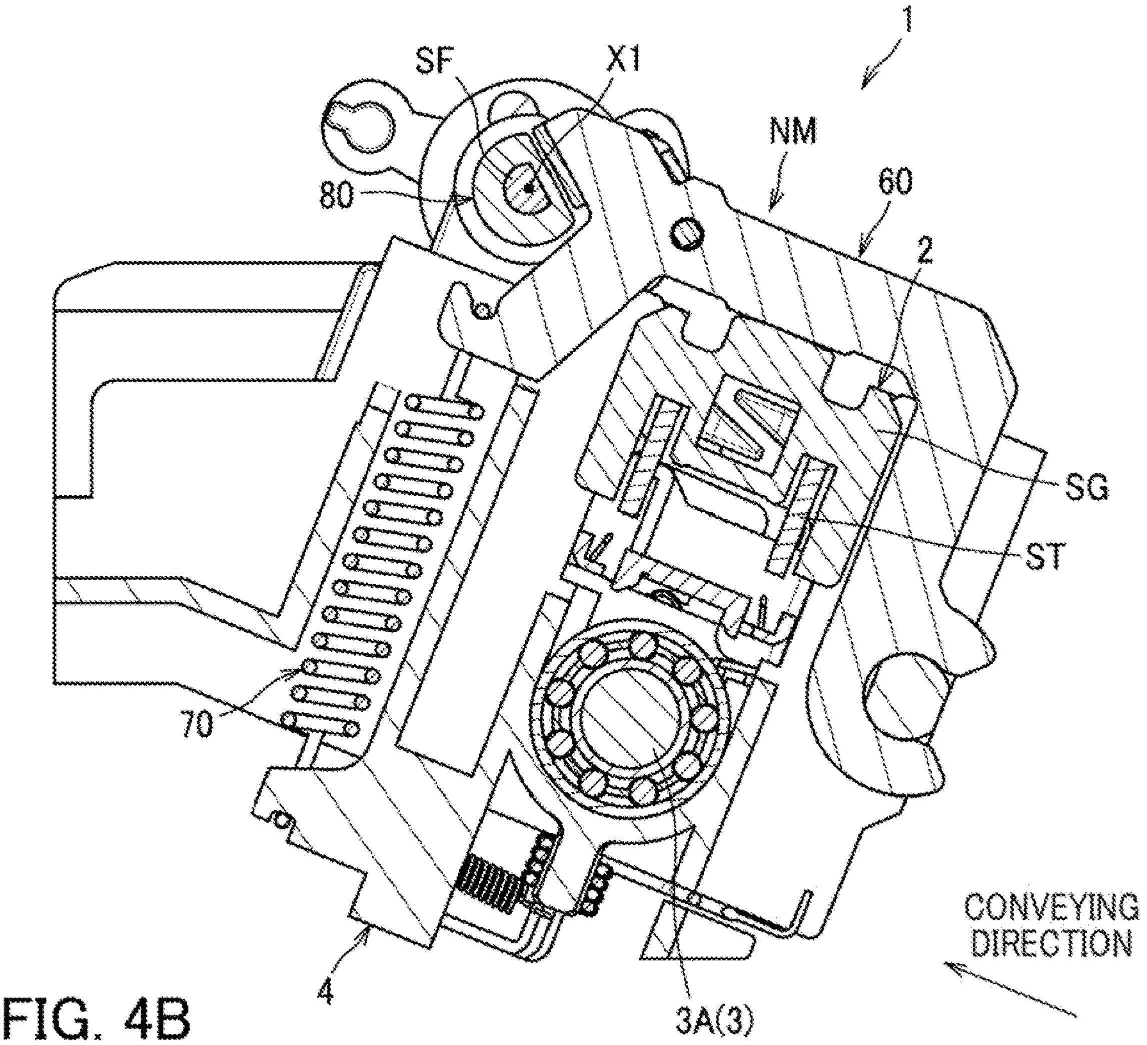
FIG. 4A is a cross-sectional view of a nipping pressure changing mechanism in a state where the nipping pressure changing mechanism provides a first nipping pressure.

As illustrated in FIG. 4A, the fixing device 1 further includes a nipping pressure changing mechanism NM. The nipping pressure changing mechanism NM is configured to change a nipping pressure at the nipping region NP between a first nipping pressure and a second nipping pressure lower than the first nipping pressure.

The nipping pressure changing mechanism NM includes a shaft SF, a pair of pressure arms 60, a pair of pressure springs 70, and a pair of cams 80. The frame 4 supports the shaft SF. The frame 4 also pivotally movably supports the pair of pressure arms 60, and the pair of cams 80.

One of the pressure arms 60, one of the pressure springs 70, and one of the cams 80 are provided at each end portion of the frame 4 in an axial direction of the pressure roller 3. In the following description, the axial direction of the pressure roller 3 will be simply referred to as "axial direction". The pressure arm 60, the pressure spring 70, and the cam 80 positioned at one end portion of the frame 4 in the axial direction are identical to those positioned at another end portion of the frame 4 in the axial direction in the present embodiment. Hence, for simplifying description, only the pressure arm 60, the pressure spring 70, and the cam 80 positioned at the one end portion of the frame 4 in the axial direction will be described.

Figure 6:
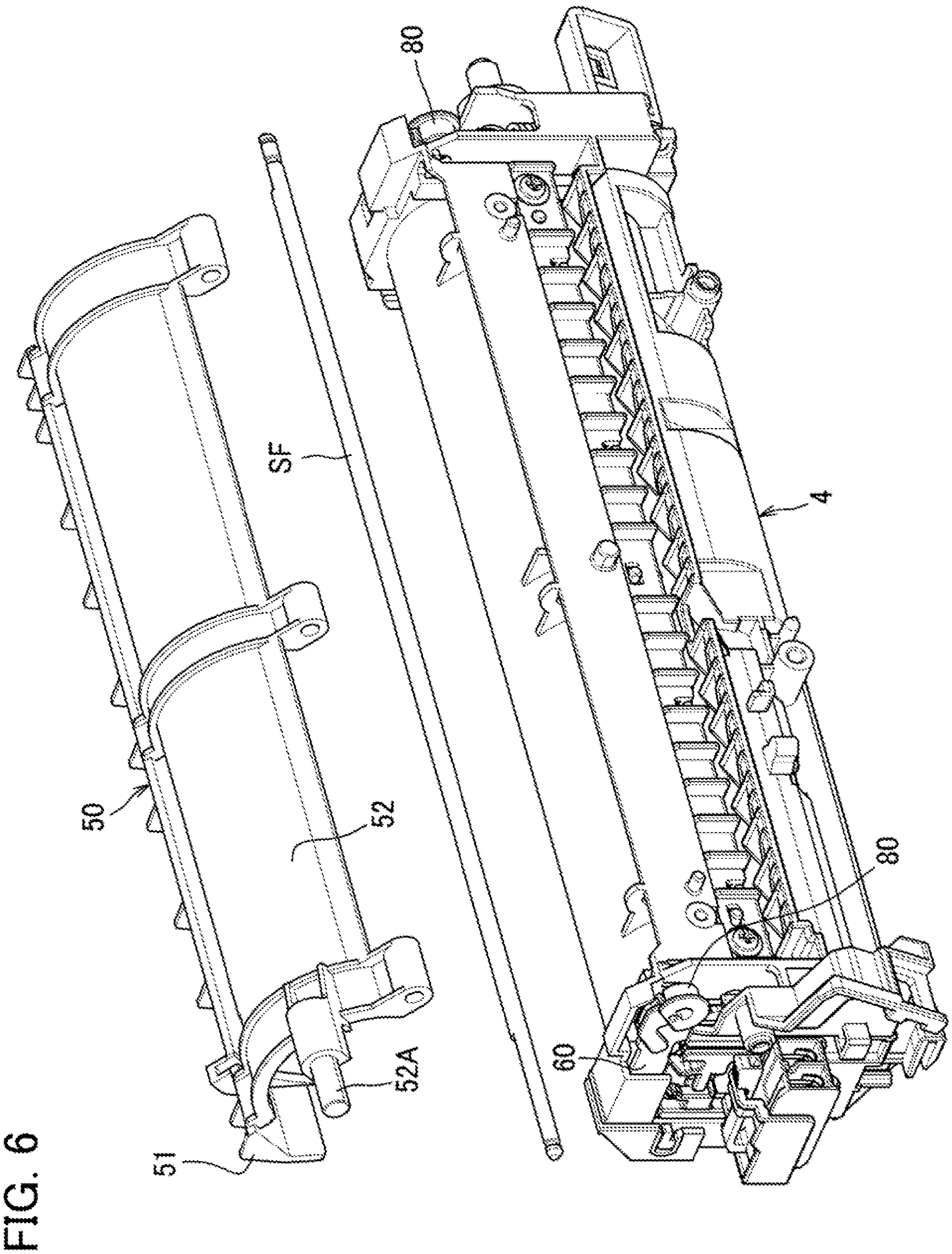
FIG. 6 is an exploded perspective view illustrating a shutter, a shaft, and a frame of the fixing device.

As illustrated in FIG. 6, the shaft SF extends in the axial direction. The shaft SF is made from, for example, metal. The shaft SF is rotatably supported by the frame 4. The shaft SF is rotatable about a first axis X1 (see FIG. 4A). The shaft SF has each end in the axial direction to which the cam 80 is fixed. The cam 80 is pivotable in accordance with the rotation of the shaft SF.

The pressure arm 60 is configured to urge the heating unit 2 toward the pressure roller 3. The pressure arm 60 is pivotally movably supported by the frame 4.

The pressure spring 70 is a tension coil spring configured to urge the pressure arm 60 toward the pressure roller 3. The pressure spring 70 has one end connected to the pressure arm 60, and another end connected to the frame 4.

The cam 80 is configured to apply pressure to the pressure arm 60 against an urging force of the pressure spring 70. Specifically, the cam 80 is pivotable about the first axis X1 between a first position (illustrated in FIG. 4A) and a second position (illustrated in FIG. 5A). The cam 80 is pivotable upon receipt of a driving force from a motor (not illustrated) through the shaft SF. Alternatively, the cam 80 may be configured to pivot through a linking mechanism (not illustrated) that can be actuated in interlocking relation to opening/closing operations of the rear cover 123 for opening and closing the second opening H2.

The nipping pressure at the nipping region NP becomes the first nipping pressure when the cam 80 is at the first position. The nipping pressure at the nipping region NP becomes the second nipping pressure lower than the first nipping pressure when the cam 80 is at the second position.

Figure 4B:
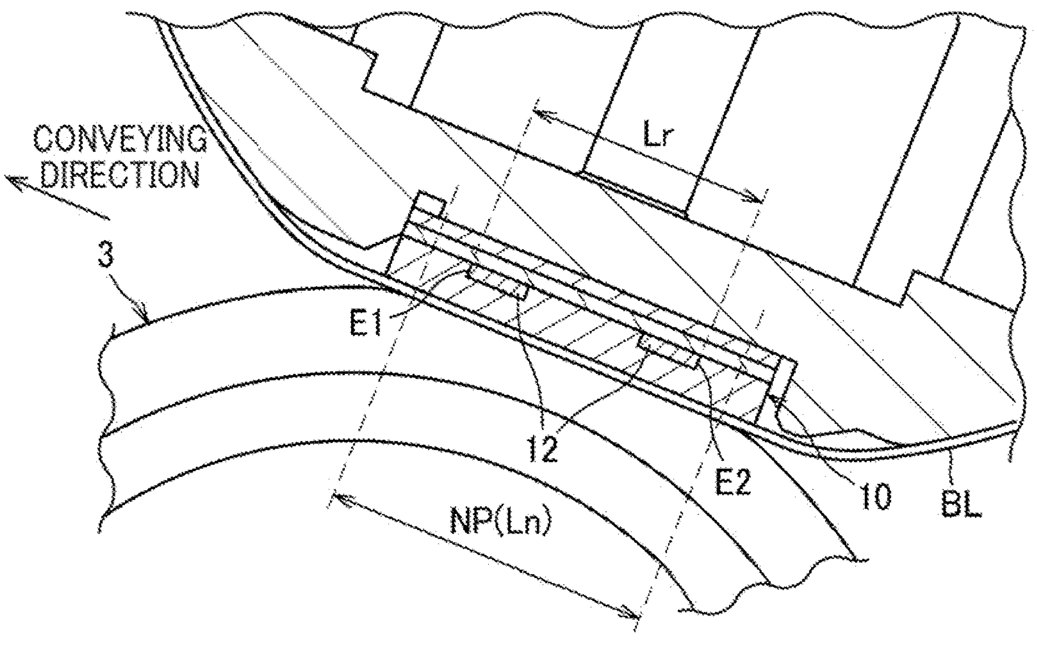
FIG. 4B is a partially enlarged cross-sectional view of the portion of the fixing device near the heater in the state where the nipping pressure changing mechanism provides the first nipping pressure.
Figure 5A:
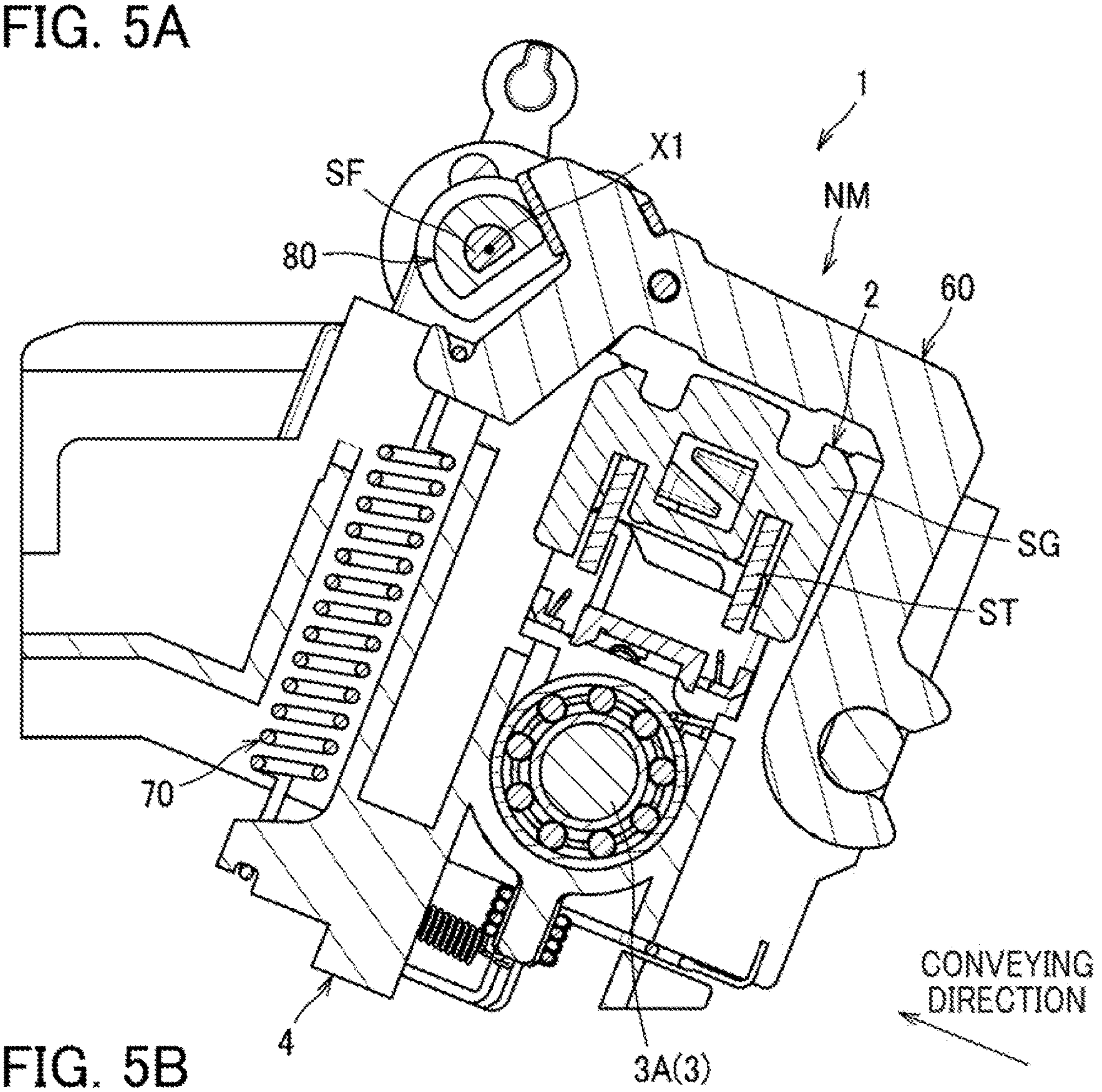
FIG. 5A is a cross-sectional view of the nipping pressure changing mechanism in a state where the nipping pressure changing mechanism provides a second nipping pressure.
Figure 5B:
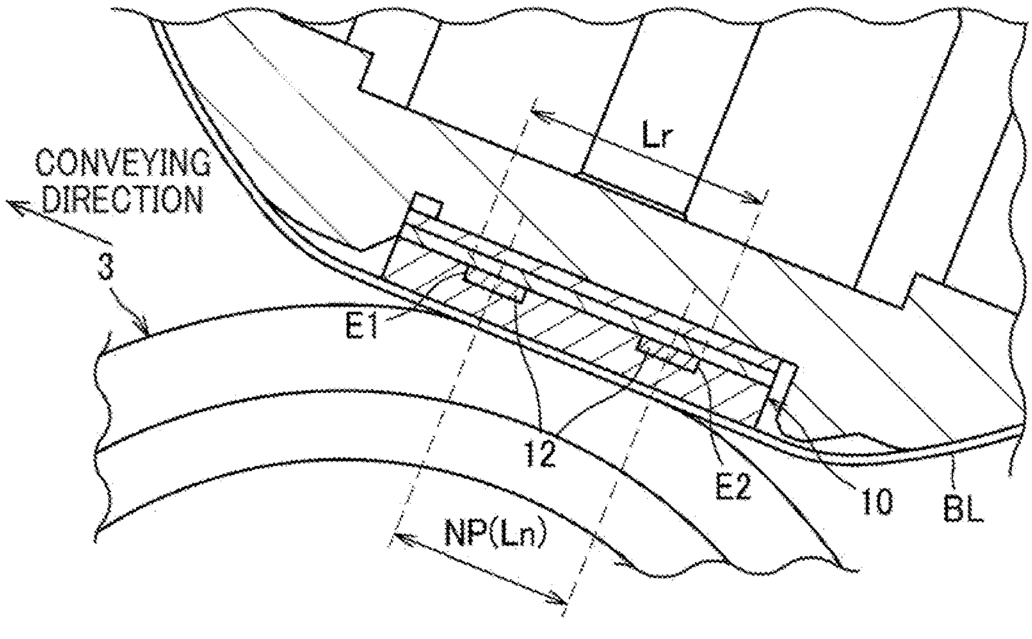
FIG. 5B is a partially enlarged cross-sectional view of the portion of the fixing device near the heater in the state where the nipping pressure changing mechanism provides the second nipping pressure.

FIGS. 4B and 5B show a nipping width Ln which is a length of the nipping region NP in the conveying direction when the first nipping pressure is applied to the nipping region NP and when the second nipping pressure is applied to the nipping region NP, respectively. In FIGS. 4B and 5B, E1 designates a most downstream end of the resistance heating element 12 in the conveying direction, and E2 designates a most upstream end of the resistance heating element 12 in the conveying direction. Further Lr designates a length between the most downstream end E1 and the most upstream end E2.

As illustrated in FIG. 4B, the nipping width Ln is greater than the length Lr when the first nipping pressure is applied to the nipping region NP. The two resistance heating elements 12 are positioned within a range of the nipping region NP in the conveying direction.

As illustrated in FIG. 5B, the nipping width Ln is smaller than the length Lr when the second nipping pressure is applied to the nipping region NP. The nipping region NP is positioned within a range defined between the most downstream end E1 and the most upstream end E2 in the conveying direction.

As illustrated in FIG. 5A, a side guide SG is positioned at each end portion of the heating unit 2 in the axial direction. Each side guide SG supports a corresponding end portion of the stay ST in the axial direction. The side guides SG are movably supported by the frame 4. The pressure arm 60 is configured to press the corresponding side guide SG toward the pressure roller 3.

As illustrated in FIG. 6, the fixing device 1 further includes a shutter 50. The shutter 50 is pivotally movably supported by the shaft SF. Hence, the shutter 50 is pivotally movable about the first axis X1, as illustrated in FIGS. 7 and 8.

Figure 7:
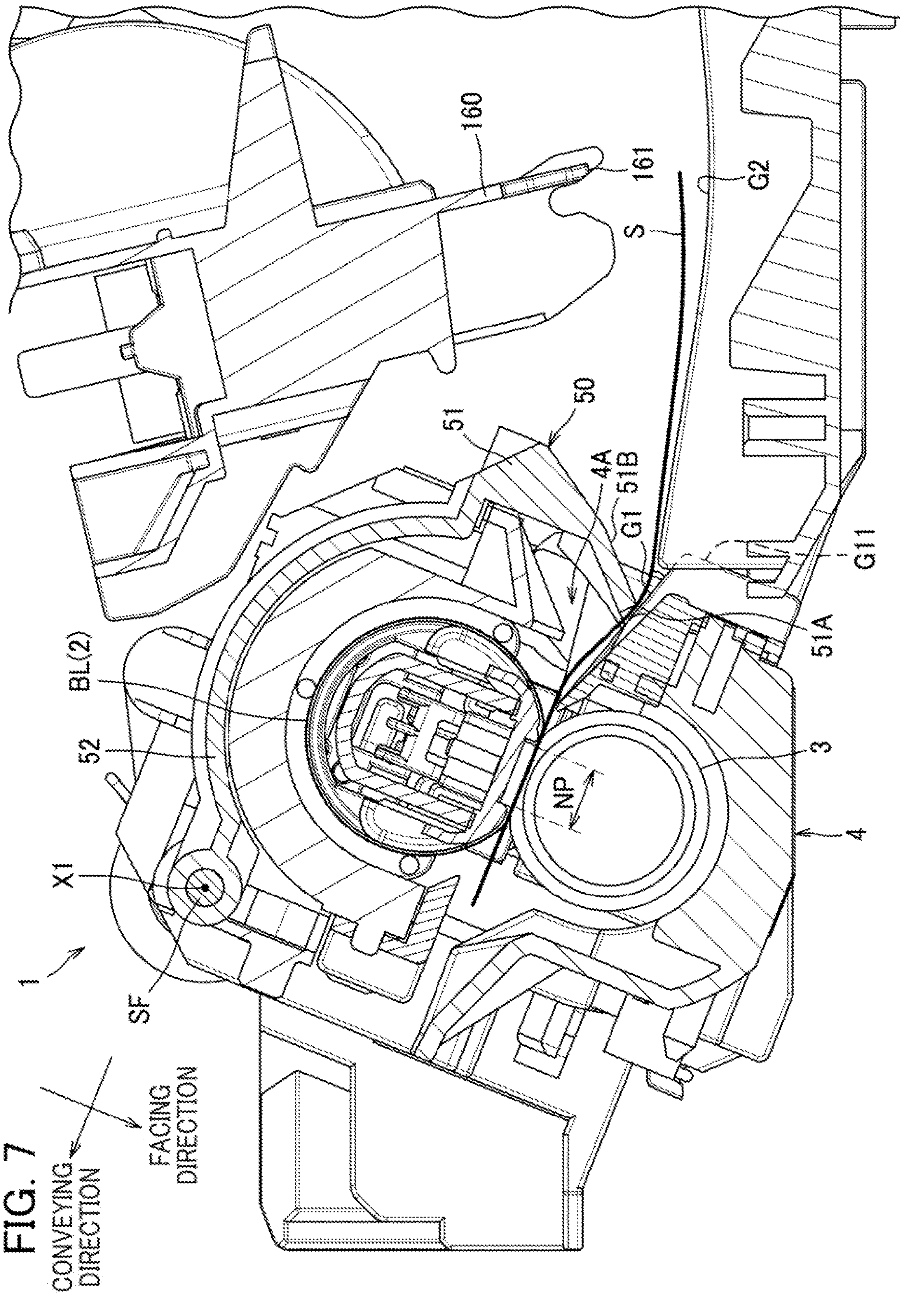
FIG. 7 is a cross-sectional view of the fixing device and a structure nearby in a state where the shutter is at a closed position.
Figure 8:
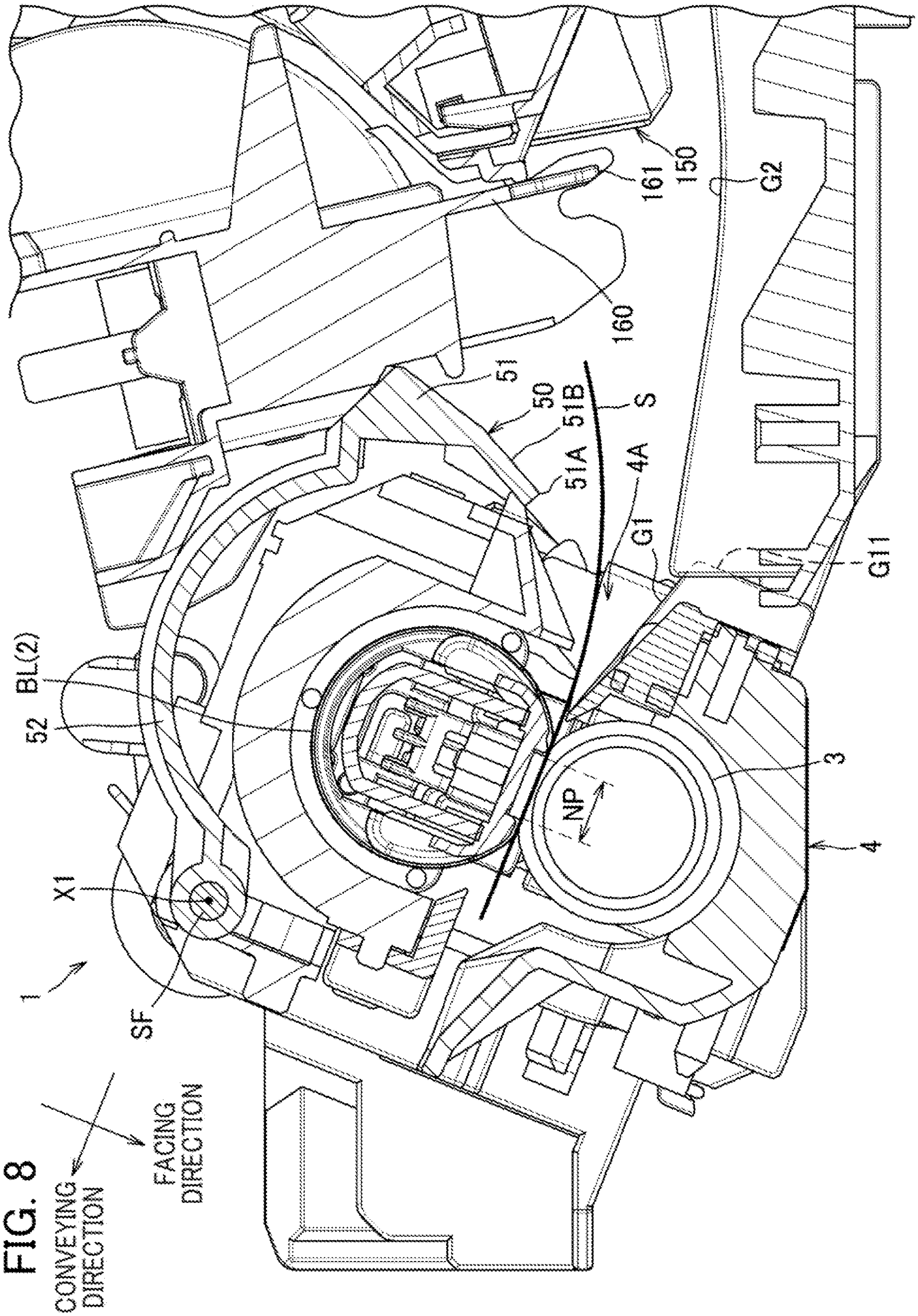
FIG. 8 is a cross-sectional view of the fixing device and the structure nearby in a state where the shutter is at an open position.

Referring to FIGS. 7 and 8, the frame 4 has an opening 4A through which the sheet S conveyed toward the nipping region NP is configured to pass. The opening 4A is positioned upstream relative to the nipping region NP in the conveying direction.

The shutter 50 is pivotally movable between a closed position illustrated in FIG. 7 and an open position illustrated in FIG. 8. The shutter 50 closes the opening 4A when the shutter 50 is at the closed position. The shutter 50 opens the opening 4A when the shutter 50 is at the open position.

The first axis X1 (i.e., a pivot center of the shutter 50) is positioned downstream relative to the nipping region NP in the conveying direction. Specifically, the first axis X1 is positioned downstream relative to the belt BL of the heating unit 2. Further, the first axis X1 is positioned closer to the belt BL than to the nipping region NP in a facing direction in which the belt BL and the pressure roller 3 face each other.

Hereinafter, the facing direction is assumed to be a direction from the heating unit 2 toward the pressure roller 3, as indicated by arrows in FIGS. 7 and 8.

The shutter 50 includes a shutter body 51 and a shutter arm 52.

The shutter body 51 is a part configured to open and close the opening 4A. The shutter body 51 extends in parallel to the first axis X1.

The shutter arm 52 has one end portion pivotably supported by the shaft SF. The shutter arm 52 has another end portion integrally connected to the shutter body 51. The shutter arm 52 extends from the shutter body 51 to the shaft SF. The shutter arm 52 extends in a direction parallel to the first axis X1. The shutter arm 52 is curved to be convex away from the nipping region NP. The heating unit 2 is positioned between the shutter arm 52 and the pressure roller 3 in the facing direction.

The fixing device 1 also includes a sheet guide G1 configured to guide the sheet S toward the nipping region NP. The sheet guide G1 is positioned upstream of the nipping region NP in the conveying direction. The sheet guide G1 has a most upstream end G11 in the conveying direction. The most upstream end G11 is positioned closer to the pressure roller 3 than to the nipping region NP in the facing direction. In the present embodiment, an entirety of the sheet guide G1 is positioned closer to the pressure roller 3 than to the nipping region NP in the facing direction.

The sheet guide G1 is so positioned that the sheet S can pass through a gap between the sheet guide G1 and a tip end 51A of the shutter 50 when the shutter 50 is at the open position. The tip end 51A of the shutter 50 is a most downstream end of the shutter 50 in a pivotally moving direction of the shutter 50 when the shutter 50 pivots from the open position to the closed position.

The tip end 51A of the shutter 50 is positioned closer to the sheet guide G1 when the shutter 50 is at the at the closed position than at the open position. The tip end 51A of the shutter 50 is positioned more downstream in the conveying direction when the shutter 50 is at the closed position 50 than at the open position. The tip end 51A of the shutter 50 is positioned downstream of the most upstream end G11 of the sheet guide G1 in the conveying direction when the shutter 50 is at the closed position. The shutter body 51 extends from the shutter arm 52 obliquely toward downstream in the conveying direction when the shutter 50 is at the closed position.

More specifically, when the shutter 50 is at the closed position, the shutter body 51 extends to slope relative to the conveying direction such that an outer surface 51B of the shutter body 51 (the outer surface opposite an inner surface facing the heating unit 2) extends obliquely toward downstream in the conveying direction as approaching toward the sheet guide G1 in the facing direction. The tip end 51A of the shutter 50 is on the outer surface 51B of the shutter body 51.

As illustrated in FIGS. 1, 7 and 8, the laser printer 100 further includes a wall 160 and a sheet guide G2 positioned in the housing 120.

The wall 160 is positioned between the process cartridge 150 (attached to the housing 120) and the fixing device 1 in the conveying direction. The wall 160 extends generally in an up-down direction. The sheet guide G2 of the housing 120 is a guide configured to guide the sheet S toward the sheet guide G1 of the fixing device 1. The sheet guide G2 is positioned adjacent to and upstream of the sheet guide G1 in the conveying direction.

The sheet guide G2 of the housing 120 is positioned spaced apart from the wall 160 in the up-down direction. The wall 160 and the sheet guide G2 provide a space therebetween such that the sheet S can pass through the space in the conveying direction. The tip end 51A of the shutter 50 is positioned closer to the sheet guide G2 of the housing 120 when the shutter 50 is at the closed position than at the open position.

Specifically, the tip end 51A of the shutter 50 is positioned above a lowermost end 161 of the wall 160 in the up-down direction when the shutter 50 is at the open position. The tip end 51A of the shutter 50 is positioned below the lowermost end 161 of the wall 160 in the up-down direction when the shutter 50 is at the closed position.

In other words, when the shutter 50 is at the open position, the tip end 51A of the shutter 50 is positioned farther away from the sheet guide G2 than the lowermost end 161 of the wall 160 is from the sheet guide G2 in an extending direction of the wall 160. Further, when the shutter 50 is at the closed position, the tip end 51A of the shutter 50 is positioned closer to the sheet guide G2 than the lowermost end 161 of the wall 160 is to the sheet guide G2 in the extending direction of the wall 160.

In the following description, an upstream edge of the sheet S in the conveying direction will be referred to as a trailing edge of the sheet S. In a case where the sheet S is curled and jammed at the fixing device 1, the trailing edge of the sheet S may not be observed by a user since the trailing edge of the sheet S is positioned above the lowermost end 161 of the wall 160, as illustrated in FIG. 8. Even in this case, according to the configuration of the embodiment, the tip end 51A of the shutter 50 can press the jammed sheet S from above by the pivotal movement of the shutter 50 from the open position to the closed position, as illustrated in FIG. 7, thereby moving the trailing edge of the sheet S to the space between the wall 160 and the sheet guide G2. Hence, a user can visually observe the trailing edge of the jammed sheet S.

Figure 9:
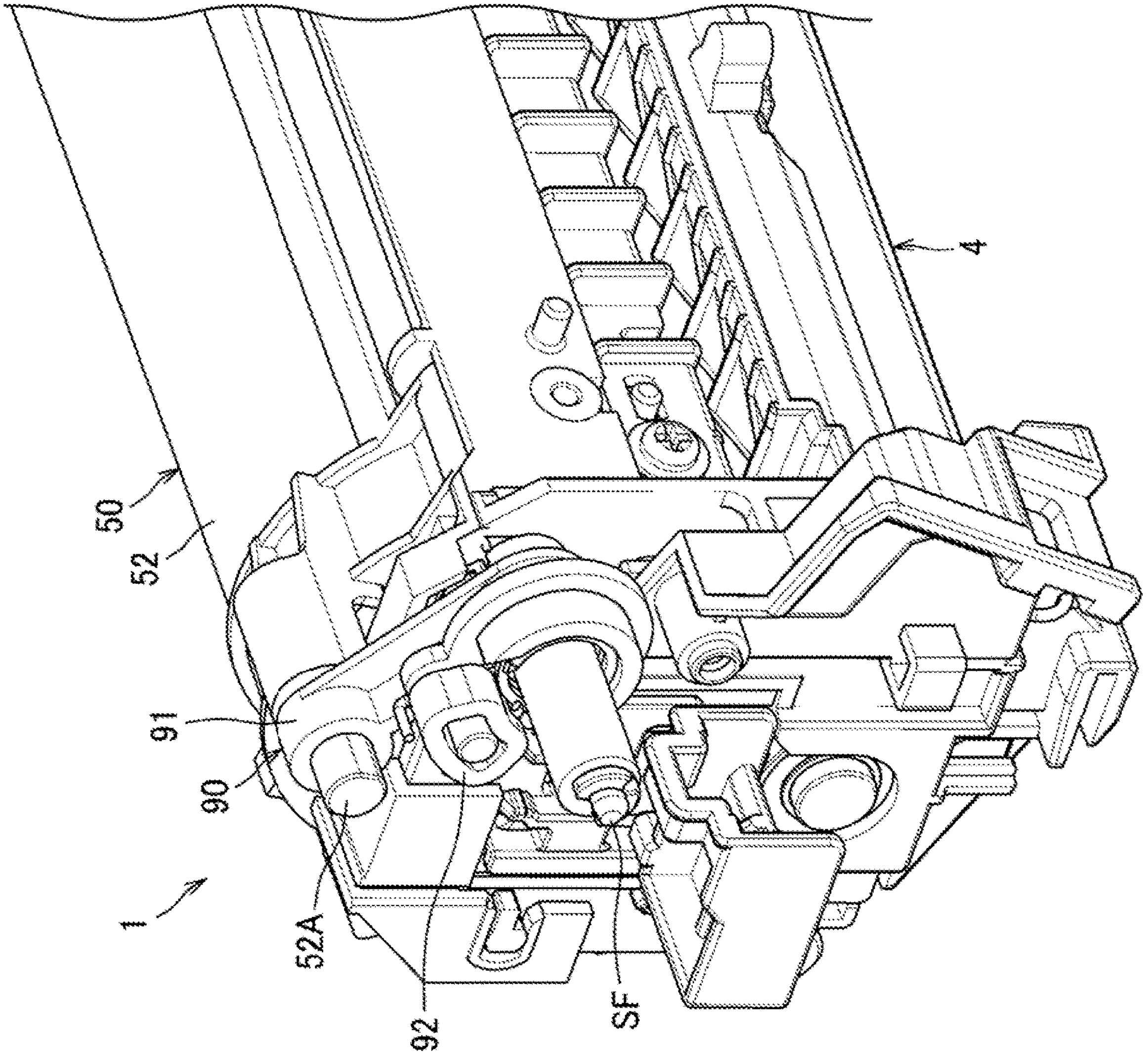
FIG. 9 is a schematic perspective view of a shutter actuation mechanism of the fixing device.
Figure 10:
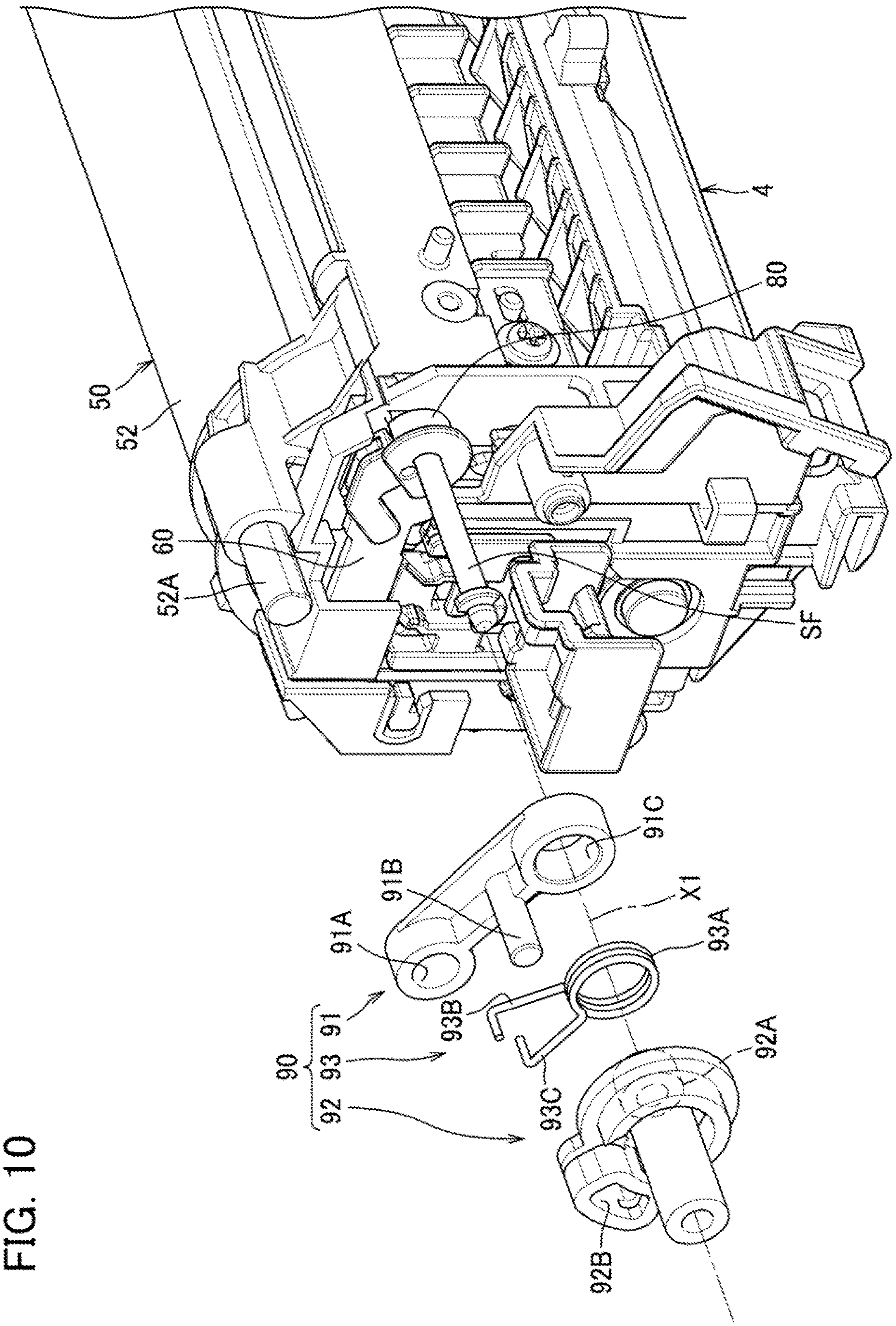
FIG. 10 is an exploded perspective view of the shutter actuation mechanism.

As illustrated in FIG. 9, the fixing device 1 further includes a shutter actuation mechanism 90 for opening and closing the shutter 50. Specifically, as illustrated in FIG. 10, the shutter actuation mechanism 90 includes a linking arm 91, an arm cam 92, and a spring 93. The linking arm 91 and the arm cam 92 are made from resin. The spring 93 is made from metal.

A first boss 52A protrudes outward in the axial direction from the shutter arm 52. The first boss 52A is positioned offset from the first axis X1.

The linking arm 91 is connected to the first boss 52A to pivotally move the shutter 50 between the closed position and the open position. The linking arm 91 is pivotally movable about the first axis X1, independent of the pivoting of the cam 80. The linking arm 91 has a first hole 91A and a second hole 91C, and a second boss 91B.

The first hole 91A receives the first boss 52A of the shutter 50. The linking arm 91 is pivotally movably connected to the shutter 50 by the first boss 52A and the first hole 91A. In other words, the linking arm 91 is pivotally movable about the first boss 52A relative to the shutter 50.

The second boss 91B protrudes outward in the axial direction. The second boss 91B is positioned between the first hole 91A and the second hole 91C.

The second hole 91C receives a third boss 92A (described later) of the arm cam 92, as will be described later.

The spring 93 is a torsion spring including a coil part 93A, a first arm part 93B extending from one end of the coil part 93A, and a second arm part 93C extending from another end of the coil part 93A. The first arm part 93B and the second arm part 93C are configured to make contact with the second boss 91B of the linking arm 91 in a pivotally moving direction of the linking arm 91 (see FIGS. 11B and 12B).

The arm cam 92 is pivotably movable about the first axis X1 to urge the linking arm 91 at a position offset from the first axis X1 to pivotally move the linking arm 91. The arm cam 92 has the third boss 92A, an elongated slot 92B, and a pressure part 92C (illustrated in FIG. 11B).

The third boss 92A is rotatably supported by the shaft SF. The third boss 92A extends through the coil part 93A for supporting the coil part 93A. Further, the third boss 92A extends through the second hole 91C of the linking arm 91 for pivotally movably supporting the linking arm 91. Accordingly, the linking arm 91 and the arm cam 92 are pivotally movably connected to each other through the second hole 91C and the third boss 92A.

The second boss 91B of the linking arm 91 extends through the elongated slot 92B. The elongated slot 92B has an arcuate shape centered on the first axis X1.

Figure 11A:
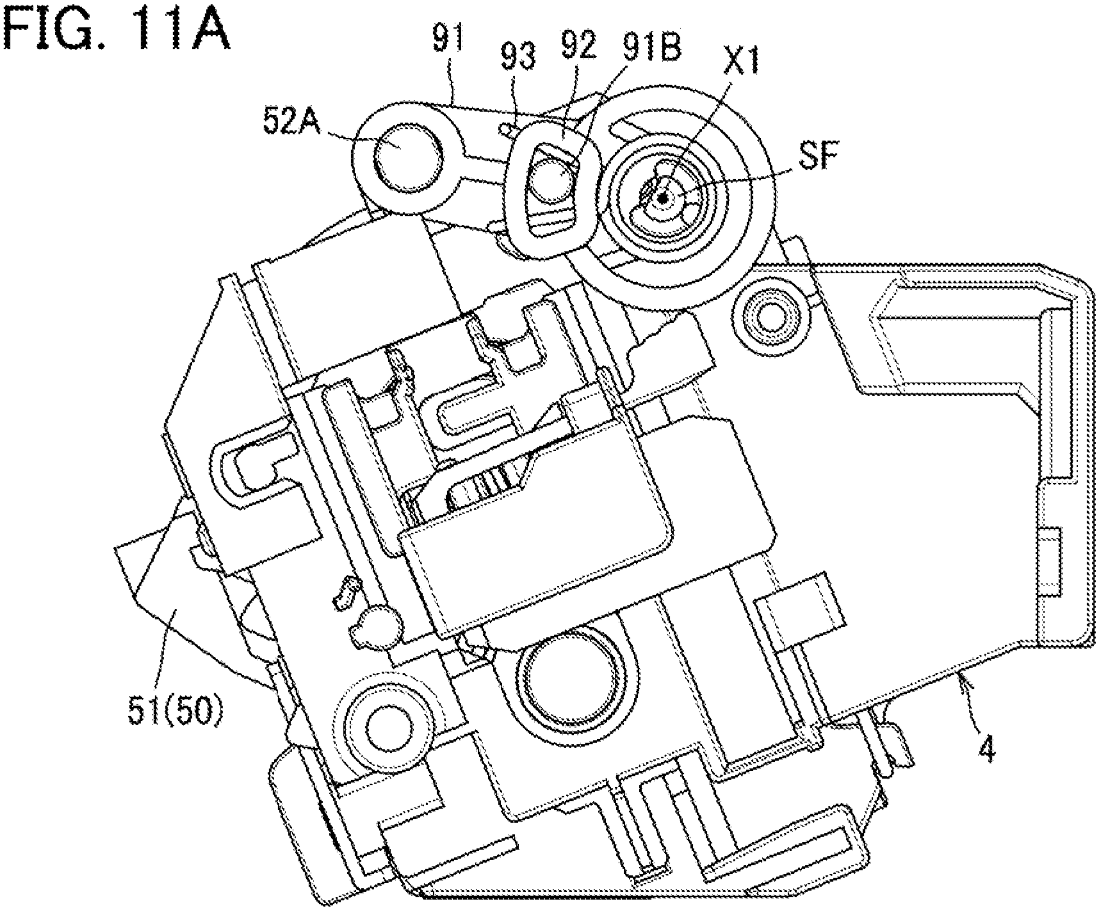
FIG. 11A is a side view of the fixing device in the state where the shutter is at the closed position.
Figure 11B:
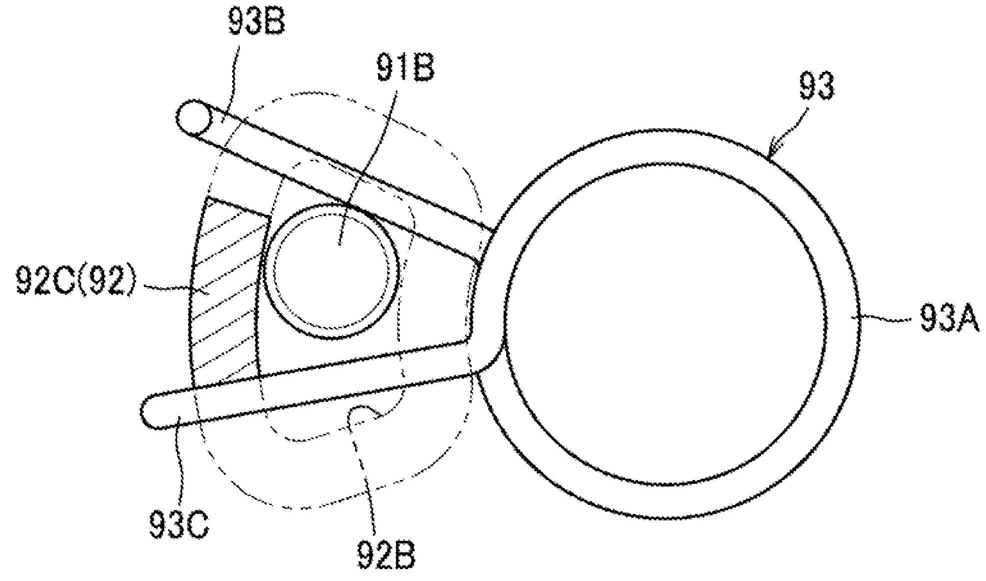
FIG. 11B is a view illustrating a positional relationship among a pressure portion, a spring, and a second boss of the shutter actuating mechanism in the state where the shutter is at the closed position.

As illustrated in FIG. 11B, the pressure part 92C is positioned between the first arm part 93B and the second arm part 93C of the spring 93 in a pivotally moving direction of the arm cam 92. The arm cam 92 is pivotable between a cam closing position (illustrated in FIG. 11A) and a cam opening position (illustrated in FIG. 12A). When the arm cam 92 is at the cam closing position, the shutter 50 is at the closed position. When the arm cam 92 is at the cam opening position, the shutter 50 is at the open position.

As the arm cam 92 pivots from the cam opening position to the cam closing position, the pressure part 92C presses the second arm part 93C of the spring 93 to pivotally move the spring 93 in a counterclockwise direction in FIG. 11B. The first arm part 93B of the spring 93 then presses the second boss 91B of the linking arm 91 to pivotally move the linking arm 91 in the counterclockwise direction in FIG. 11B. In this way, the arm cam 92 pivotally moves the shutter 50 about the first axis X1 from the open position to the closed position through the spring 93 and the linking arm 91.

As illustrated in FIGS. 11A and 11B, when the shutter 50 is at the closed position, the pressure part 92C is in contact with the second arm part 93C, and the first arm part 93B of the spring 93 is in contact with the second boss 91B of the linking arm 91. That is, the arm cam 92 presses the linking arm 91 through the spring 93 to place the shutter 50 at the closed position.

Figure 12A:
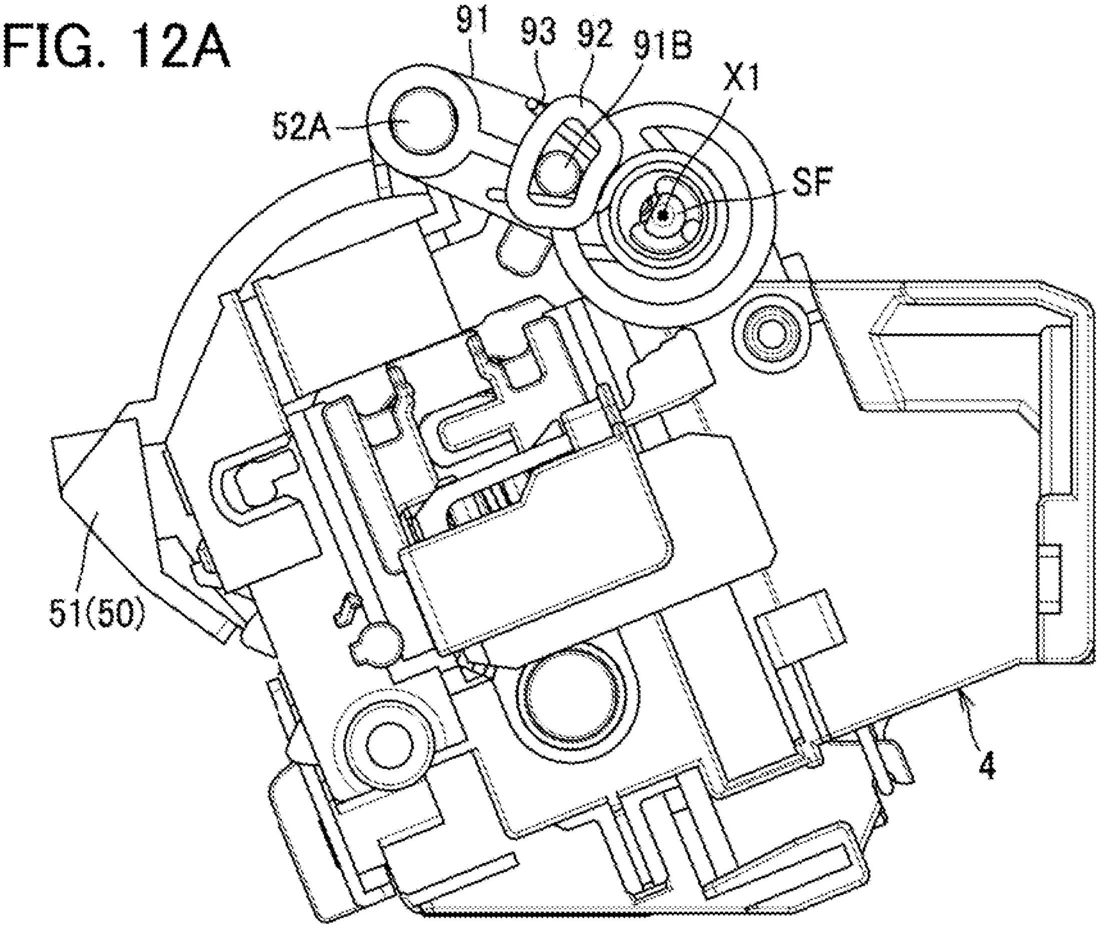
FIG. 12A is a side view of the fixing device in the state where the shutter is at the open position.
Figure 12B:
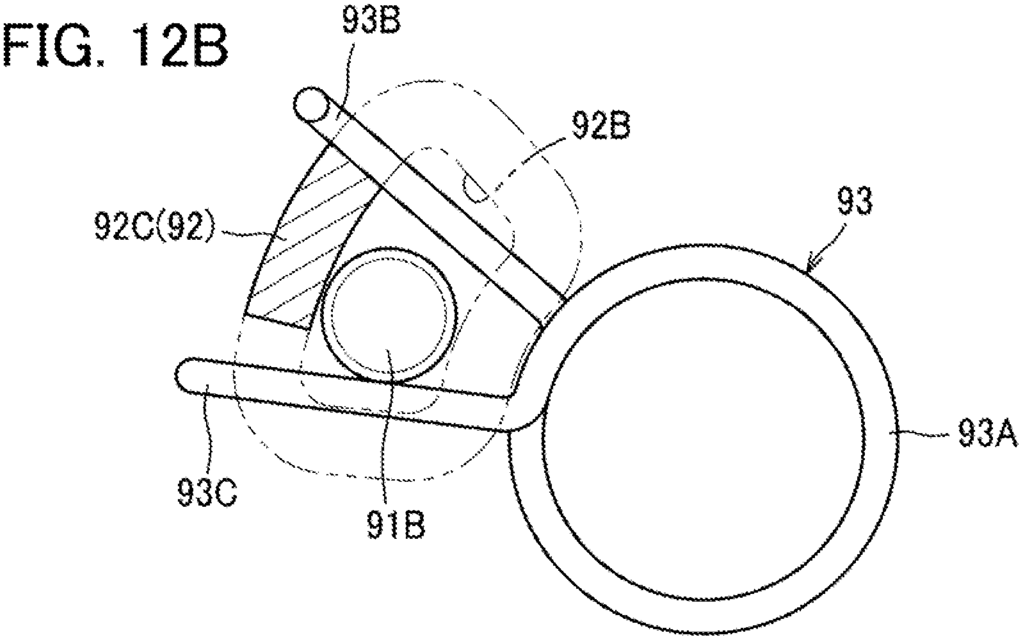
FIG. 12B is a view illustrating a positional relationship among the pressure portion, the spring, and the second boss of the shutter actuating mechanism in the state where the shutter is at the open position.

As the arm cam 92 pivots from the cam closing position to the cam opening position, the pressure part 92C presses the first arm part 93B of the spring 93 to pivotally move the spring 93 in a clockwise direction in FIG. 12B. The second arm part 93C of the spring 93 thus presses the second boss 91B of the linking arm 91 to pivotally move the linking arm 91 in the clockwise direction in FIG. 12B. Accordingly, the arm cam 92 pivotally moves the shutter 50 about the first axis X1 from the closed position to the open position through the spring 93 and the linking arm 91.

As illustrated in FIGS. 12A and 12B, when the shutter 50 is at the open position, the pressure part 92C is in contact with the first arm part 93B of the spring 93, and the second arm part 93C of the spring 93 is in contact with the second boss 91B of the linking arm 91. That is, the arm cam 92 presses the linking arm 91 through the spring 93 to place the shutter 50 at the open position.

The arm cam 92 is caused to pivotally move by an interlocking mechanism (not illustrated) operable in interlocking relation to attachment/detachment operations of the process cartridge 150 relative to the housing 120. The interlocking mechanism may be configured of a plurality of links, for example. The interlocking mechanism may be configured to contact a part of the process cartridge 150 during the attachment operation of the process cartridge 150 to the housing 120, so that a force applied to the process cartridge 150 can be transmitted to the arm cam 92 to pivotally move the arm cam 92 from the cam closing position to the cam opening position. Further, the interlocking mechanism may be configured to contact a part of the process cartridge 150 during the detachment operation of the process cartridge 150 from the housing 120, so that a force applied to the process cartridge 150 can be transmitted to the arm cam 92 to pivotally move the arm cam 92 from the cam opening position to the cam closing position.

As illustrated in FIG. 8, in a case where a curled sheet S is jammed at the fixing device 1, the trailing edge of the sheet S may be positioned above the lowermost end 161 of the wall 160. Even in such a case, in accordance with a user's detachment operation of the process cartridge 150 from the housing 120, the arm cam 92 is pivotally moved from the cam closing position to the cam opening position upon receipt of the force from the interlocking mechanism (not illustrated). As such, the arm cam 92 pushes the shutter 50 through the spring 93 and the linking arm 91 to pivotally move the shutter 50 from the open position to the closed position.

As the shutter 50 pivots from the open position to the closed position, the tip end 51A of the shutter 50 moves downward to slidingly push the sheet S downward, as illustrated in FIG. 7. The trailing edge of the sheet S is thus moved downward to a position lower than the lowermost end 161 of the wall 160. Accordingly, a user can reach the trailing edge of the jammed sheet S after detachment of the process cartridge 150 from the housing 120 to remove the jammed sheet S from the housing 120 through the first opening H1.

3. Operational and Technical Advantages of the Embodiment

The shutter 50 is configured to pivot about the first axis X1 which is coincident with the pivot axis of the cam 80. With this configuration, a mechanical component constituting the pivot center of the shutter 50 is not necessary to be provided at the frame 4 of the fixing device 1, in addition to the component constituting the pivot axis of the cam 80. Accordingly, the laser printer 100 can be made compact.

In the fixing device 1 according to the embodiment, the shaft SF (a single member) supports the shutter 50 as well as the cam 80. With this configuration, a smaller number of parts are required to constitute the fixing device 1 than otherwise.

The first axis X1 is positioned downstream relative to the nipping region NP in the conveying direction. This configuration can enlarge the distance between the shutter body 51 and the first axis X1, thereby reducing the pivotally moving amount of the shutter 50 that is required for opening and closing the shutter 50.

In particular, according to the present embodiment, since the first axis X1 is positioned downstream relative to the heating unit 2 in the conveying direction, the shutter body 51 can be located farther away from the first axis X1. Accordingly, this configuration of the embodiment can further reduce the pivotally moving amount of the shutter 50 that is required for opening and closing the shutter 50.

Further, in the fixing device 1 according to the embodiment, the tip end 51A of the shutter 50 is positioned closer to the sheet guide G1 when the shutter 50 is at the closed position than at the open position. With this structure, even if a sheet S is jammed at the nipping region NP and a trailing edge of the jammed sheet S is curved in a direction away from the sheet guide G1, simply closing the shutter 50 can push the jammed sheet S toward the sheet guide G1. As such, a user can easily grasp the jammed sheet S pushed against the sheet guide G1 and remove the same, without damaging working efficiency in addressing a paper jam.

According to the above-described embodiment, the first axis X1 is positioned closer to the heating unit 2 than to the nipping region NP in the facing direction, and the most upstream end G11 of the sheet guide G1 in the conveying direction is positioned closer to the pressure roller 3 than to the nipping region NP in the facing direction. Therefore, the shutter 50 can be made more compact in comparison with a structure where the first axis X1 is positioned closer to the pressure roller 3 than to the nipping region NP in the facing direction.

According to the above-described embodiment, the tip end 51A of the shutter 50 is positioned more downstream in the conveying direction when the shutter 50 is at the closed position than at the open position. That is, the tip end 51A of the shutter 50 moves toward downstream in the conveying direction in accordance with the pivotal movement of the shutter from the open position to the closed position. With this configuration, upon occurrence of a paper jam of the sheet S at the nipping region NP, the tip end 51A of the shutter 50 can slide along the surface of the sheet S and push the sheet S gently in accordance with the pivotal movement of the shutter 50 from the open position to the closed position.

When the shutter 50 is at the closed position, the shutter body 51 slopes relative to the conveying direction such that the shutter body 51 extends from the shutter arm 52 diagonally toward downstream in the conveying direction. Therefore, the sheet S jammed at the nipping region NP is less likely to be hidden by the shutter 50, compared to a structure where the shutter body 51 extends from the shutter arm 52 toward upstream in the conveying direction.

Further, the tip end 51A of the shutter 50 is positioned downstream of the most upstream end G11 of the sheet guide G1 when the shutter 50 is at the closed position. This configuration can reduce a gap distance between the tip end 51A of the shutter 50 and the most upstream end G11 of the sheet guide G1 to reliably suppress accidental insertion of a user's finger into the opening 4A of the frame 4.

[Modifications]

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the shutter body 51 is integral with the shutter arm 52. However, a shutter body and a shutter arm of the disclosure may be prepared as separate members.

Further, in the above-described embodiment, the arm cam 92 is configured to operate in interlocking relation to the attachment/detachment operations of the process cartridge 150. Alternatively, the arm cam 92 may be configured to operate in interlocking relation to opening/closing motions of the front cover 121.

Further, the spring 93 need not be a torsion spring, but may be a leaf spring or a coil spring.

In the embodiment, the endless belt BL is employed an example of a first rotatable body of the disclosure. Alternatively, the first rotatable body of the disclosure may be a heat roller configured of a cylindrical metal tube.

In the embodiment, the pressure roller 3 is employed as an example of a second rotatable body of the disclosure. Alternatively, the second rotatable body of the disclosure may be a belt of a pressure unit including a pressure pad. In this case, the belt as the second rotatable body may be nipped between the pressure pad and the first rotatable body.

Still alternatively, the first rotatable body of the disclosure may be a pressure roller or a belt of a pressure unit. The second rotatable body of the disclosure may be a belt configured to be heated by a heater, or a heat roller.

The heater of the disclosure need not be a ceramic heater, but may be a halogen lamp. In the latter case, a heat unit may include a belt, a nipping plate configured to nip the belt in cooperation with a pressure roller, and a heater configured to heat the nipping plate.

The parts and components employed in the above-described embodiment and modifications thereto may be suitably selected and combined together.

REMARKS

The fixing device 1 is an example of a fixing device. The belt BL is an example of a first rotatable body. The pressure roller 3 is an example of a second rotatable body. The nipping region NP is an example of a nipping region. The frame 4 is an example of a frame. The opening 4A is an example of an opening of the frame. The shutter 50 is an example of a shutter. The first axis X1 is an example of a first axis. The sheet guide G1 is an example of a sheet guide. The most upstream end G11 is an example of a most upstream end of the sheet guide. The tip end 51A is an example of a tip end of the shutter. The shutter body 51 is an example of a shutter body of the shutter. The shutter arm 52 is an example of a shutter arm of the shutter. The pressure arm 60 is an example of a pressure arm. The cam 80 is an example of a cam. The shaft SF is an example of a shaft. The linking arm 91 is an example of a linking arm. The arm cam 92 is an example of an arm cam. The spring 93 is an example of a spring. The heater 10 is an example of a heater.

What is claimed is:

1. A fixing device comprising:
a first rotatable body;
a second rotatable body, the first rotatable body and the second rotatable body providing a nipping region therebetween where a sheet is configured to be conveyed in a conveying direction;
a frame supporting the first rotatable body and the second rotatable body, the frame having an opening to allow the sheet to pass through the opening to be conveyed toward the nipping region; and
a shutter pivotally movable about a first axis between a closed position where the shutter closes the opening and an open position where the shutter opens the opening, the first axis being positioned downstream of the nipping region in the conveying direction.

2. The fixing device according to claim 1, further comprising a sheet guide configured to guide the sheet toward the nipping region,
wherein the shutter has a tip end, the sheet guide and the tip end of the shutter providing a gap therebetween to allow the sheet to pass through the gap to be conveyed toward the nipping region, and
wherein the tip end of the shutter is positioned closer to the sheet guide when the shutter is at the closed position than at the open position.

3. The fixing device according to claim 2,
wherein the first axis is positioned closer to the first rotatable body than to the nipping region in a facing direction in which the first rotatable body faces the second rotatable body, and
wherein the sheet guide has a most upstream end in the conveying direction, the most upstream end being positioned closer to the second rotatable body than to the nipping region in the facing direction.

4. The fixing device according to claim 2,
wherein the tip end of the shutter is positioned more downstream in the conveying direction when the shutter is at the closed position than at the open position.

5. The fixing device according to claim 2,
wherein the shutter comprises:
a shutter body configured to open and close the opening; and
a shutter arm extending from the shutter body to the first axis, the shutter body extending from the shutter arm to slope, relative to the conveying direction, toward downstream in the conveying direction when the shutter is at the closed position.

6. The fixing device according to claim 5,
wherein the shutter arm is curved in a direction away from the nipping region.

7. The fixing device according to claim 5,
wherein the shutter body is integral with the shutter arm.

8. The fixing device according to claim 2,
wherein the sheet guide has a most upstream end in the conveying direction, and
wherein the tip end of the shutter is positioned downstream of the most upstream end of the sheet guide in the conveying direction when the shutter is at the closed position.

9. The fixing device according to claim 1,
wherein the first axis is positioned downstream of the first rotatable body in the conveying direction.

10. The fixing device according to claim 1, further comprising:
a pressure arm configured to urge the first rotatable body toward the second rotatable body to provide a nipping pressure at the nipping region; and
a cam pivotable about the first axis to apply pressure to the pressure arm to change the nipping pressure at the nipping region.

11. The fixing device according to claim 10, further comprising a shaft supporting the cam and rotatable about the first axis, the shutter being pivotally movably supported by the shaft.

12. The fixing device according to claim 10, further comprising:
a linking arm connected to the shutter, the linking arm being pivotally movable about the first axis independently of pivoting of the cam to pivotally move the shutter between the closed position and the open position; and
an arm cam pivotally movable about the first axis to apply pressure to the linking arm at a position offset from the first axis to pivotally move the linking arm.

13. The fixing device according to claim 12, further comprising a spring configured to make contact with the linking arm,
wherein the arm cam is configured to apply pressure to the linking arm through the spring to place the shutter at the closed position.

14. The fixing device according to claim 12, further comprising a spring configured to make contact with the linking arm,
wherein the arm cam is configured to apply pressure to the linking arm through the spring to place the shutter at the open position.

15. The fixing device according to claim 10,
wherein the shutter comprises:
a shutter body configured to open and close the opening; and
a shutter arm extending from the shutter body to the first axis, the shutter arm being curved in a direction away from the nipping region.

16. The fixing device according to claim 1, further comprising a heater comprising a substrate and a resistance heating element,
wherein the first rotatable body is an endless belt configured to be heated by the heater and circularly movable around the heater.

* * * * *